(12) United States Patent
Owerfeldt et al.

(10) Patent No.: US 11,868,195 B2
(45) Date of Patent: Jan. 9, 2024

(54) ACTIVATION OF A SECOND PROCESSING UNIT OF A COMPUTING DEVICE THAT INCLUDES A FIRST PROCESSING UNIT AND THE SECOND PROCESSING UNIT

(71) Applicant: Robert Bosch GmbH, Stuttgart (DE)

(72) Inventors: Andre Owerfeldt, Markgroeningen (DE); Domenic Garcea, Gerlingen (DE); Lambros Dalakuras, Leonberg (DE); Liem Dang, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 91 days.

(21) Appl. No.: 17/650,606

(22) Filed: Feb. 10, 2022

(65) Prior Publication Data

US 2022/0263683 A1 Aug. 18, 2022

(30) Foreign Application Priority Data

Feb. 18, 2021 (DE) .................... 10 2021 201 573.5

(51) Int. Cl.
*G06F 1/3287* (2019.01)
*H04L 12/40* (2006.01)
(Continued)

(52) U.S. Cl.
CPC .......... *G06F 1/3287* (2013.01); *B60R 16/023* (2013.01); *G06F 1/3203* (2013.01);
(Continued)

(58) Field of Classification Search
CPC .... G06F 1/3203; G06F 1/3209; G06F 1/3287; B60R 16/023; B60R 16/033; Y02D 10/00; H04L 12/40039
See application file for complete search history.

(56) References Cited

U.S. PATENT DOCUMENTS 9,118,651 B2 * 8/2015 Kim ......................... G06F 1/32
9,606,611 B2 * 3/2017 Rennig ................ G06F 1/3209
(Continued)

FOREIGN PATENT DOCUMENTS

CN 111490918 A * 8/2020 ............. H04L 12/12
KR 2020052653 A * 5/2020 ........... B60R 16/023

OTHER PUBLICATIONS

Machine translation KR2020052653A (Year: 2020).*
Machine translation CN111490918A (Year: 2020).*

*Primary Examiner* — Glenn A. Auve (74) *Attorney, Agent, or Firm* — NORTON ROSE FULBRIGHT US LLP; Gerard A. Messina (57) ABSTRACT

A computing device that includes a first processing unit and a second processing unit that are connected to one another in a data-transmitting manner. The first processing unit, upon recognition that an activation condition is present, is configured to determine whether the activation condition requires an activation of the second processing unit, and when the activation condition requires the activation of the second processing unit, to activate the second processing unit and to output an activation signal, including the activation condition, on an activation line. Also, a network that includes at least two such computing devices, and a method for activating a second processing unit of a computing device that includes a first processing unit and the second processing unit, which are connected to one another in a data-transmitting manner, are also described.

13 Claims, 4 Drawing Sheets

(51) Int. Cl.
*B60R 16/023* (2006.01)
*G06F 1/3209* (2019.01)
*G06F 1/3203* (2019.01)

(52) U.S. Cl.
CPC ...... *G06F 1/3209* (2013.01); *H04L 12/40039* (2013.01); *H04L 12/40123* (2013.01); *H04L 12/40195* (2013.01); *H04L 2012/40215* (2013.01); *H04L 2012/40273* (2013.01); *Y02D 10/00* (2018.01)

(56) References Cited

U.S. PATENT DOCUMENTS

| | | | |
|---|---|---|---|
| 10,630,538 B2 * | 4/2020 | Kim | G06F 8/65 |
| 2012/0257655 A1 * | 10/2012 | Muth | H04L 12/12 |
| | | | 375/219 |
| 2013/0318380 A1 * | 11/2013 | Behrens | H04L 12/40039 |
| | | | 713/323 |
| 2013/0326255 A1 * | 12/2013 | Kodama | H04L 12/40039 |
| | | | 713/323 |
| 2014/0139670 A1 * | 5/2014 | Kesavan | B60W 50/0098 |
| | | | 348/148 |
| 2015/0106540 A1 * | 4/2015 | Hoffmann | B60L 53/65 |
| | | | 710/107 |
| 2017/0005828 A1 * | 1/2017 | Gino | H04L 12/40039 |
| 2019/0361711 A1 * | 11/2019 | Kim | H04L 67/12 |
| 2021/0258186 A1 * | 8/2021 | Tokunaga | H04L 12/40039 |

* cited by examiner

ACTIVATION OF A SECOND PROCESSING UNIT OF A COMPUTING DEVICE THAT INCLUDES A FIRST PROCESSING UNIT AND THE SECOND PROCESSING UNIT

CROSS REFERENCE

The present application claims the benefit under 35 U.S.C. § 119 of German Patent Application No. DE 10 2021 201 573.5 filed on Feb. 18, 2021, which is expressly incorporated herein by reference in its entirety.

FIELD

The present invention relates to a computing device that includes a first processing unit and a second processing unit that are connected to one another in a data-transmitting manner, a network that includes at least two such computing devices, and a method for activating the second processing unit.

BACKGROUND INFORMATION

Control units in motor vehicles may often be connected directly to a motor vehicle battery, so that when the motor vehicle is not in operation and is parked, for example, these control units are still connected to the motor vehicle battery and draw power from it. In order for the motor vehicle battery to not be excessively drained of power by such control units when the motor vehicle is at a standstill, it is important to place such control units in an idle mode with low energy consumption when the motor vehicle is at a standstill. The intent is for the control units to be able to "wake up" from the idle mode as quickly as possible.

SUMMARY

According to the present invention, a computing device that includes a first processing unit and a second processing unit that are connected to one another in a data-transmitting manner, a network including at least two such computing devices, a method for activating the second processing unit, and a computer program for carrying out the method, are provided. Advantageous embodiments of the present invention are disclosed herein.

The present invention provides an option for operating a computing device as energy-efficiently as possible and still quickly putting it into operation as needed. In accordance with an example embodiment of the present invention, for this purpose, in addition to the actual main processing unit (also referred to below as the second processing unit) an activation unit (also referred to below as a first processing unit) is provided in the computing device, which activates the main processing unit as needed, but in particular has much lower energy consumption in the idle mode, in particular due to the fact that it does not have to provide numerous and/or complicated functionalities, and instead its essential task is to activate the main processing unit. The main processing unit may therefore be completely switched off, in particular disconnected from a power supply, when it is not needed. The activation unit is preferably configured to activate the main processing unit by activating a power supply of the main processing unit, for example by actuating a switch.

In accordance with an example embodiment of the present invention, it is particularly advantageous when the activation unit, during start-up of the main processing unit, is capable of taking over the particularly time-critical functionality thereof until the main processing unit is able to do so itself. For this purpose, it is preferably provided for the activation unit to check whether the main processing unit is activated, and/or for the main processing unit to communicate its operating state to the activation unit.

As soon as the main processing unit has started up sufficiently to take over the requested functionality itself, the activation unit advantageously goes back into an idle mode in which it merely once again monitors the presence of an activation condition. As a result, the activation unit thus initially carries out a first portion of function steps of a function step sequence, and the main processing unit subsequently carries out a second portion of function steps of the function step sequence.

If the activation units of different computing devices in a network are connected to one another, distributed functionalities may thus also be implemented in an energy-conserving manner. In particular, the presence of an activation condition may also be recognized when an activation signal that includes the activation condition is received on an activation line.

With the distribution of functions, whose sensor system and actuator system are customarily connected directly to the executing control unit of the function, over multiple control units corresponding to the placement of their sensor system and actuator system in the vehicle, the requirements of the functions for system start-up time and quiescent current (so-called "early start-up" problem) apply for all involved control units.

A processing unit or computing device according to the present invention, for example in a vehicle, is configured, in particular by programming, to carry out a method according to the present invention, and conversely, a method according to the present invention includes all method steps that are carried out by a processing unit or computing device according to the present invention or described in conjunction with same.

In addition, the implementation of a method according to the present invention, in the form of a computer program or computer program product that includes program code for carrying out all method steps, is advantageous since it incurs particularly low costs, in particular when an executing control unit is also utilized for further tasks and therefore is present anyway. Suitable data media for providing the computer program are in particular magnetic, optical, and electrical memories such as hard disks, flash memories, EEPROMs, DVDs, and others. In addition, downloading a program via computer networks (Internet, intranet, etc.) is possible.

Further advantages and embodiments of the present invention result from the description and the figures.

The present invention is schematically illustrated in the figures based on exemplary embodiments, and described below with reference to the figures.

DETAILED DESCRIPTION OF EXAMPLE EMBODIMENTS

Figure 1:
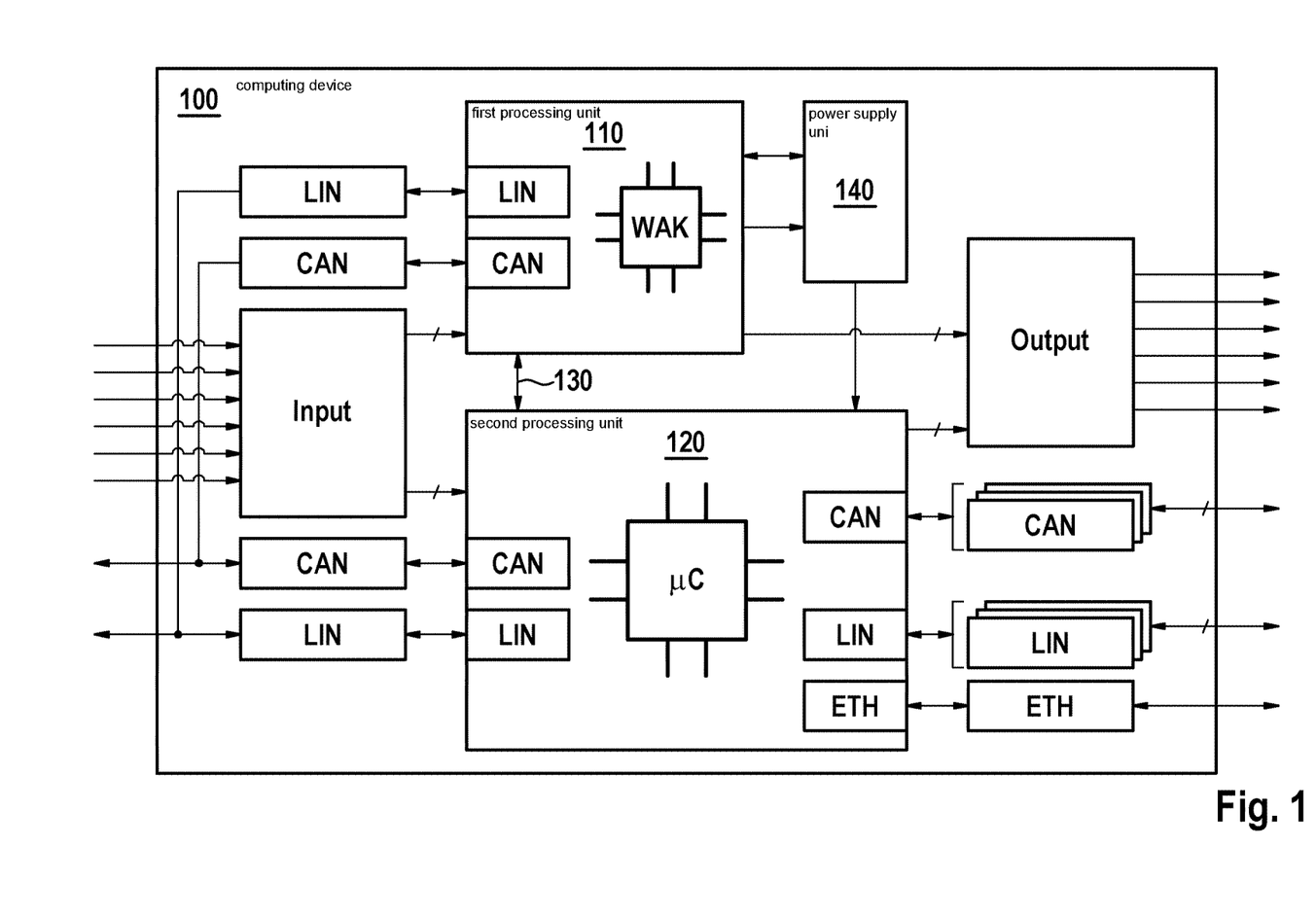
FIG. 1 shows one preferred specific embodiment of a computing device according to the present invention that includes a first and a second processing unit.

FIG. 1 shows a block diagram of one preferred specific embodiment of a computing device according to the present invention, schematically illustrated and denoted overall by reference numeral 100. Computing device 100 includes a first processing unit 110 and a second processing unit 120, which may be designed as microprocessors or microcontrollers, for example. First processing unit 110 is used as a so-called activation unit, and is connected in a data-transmitting manner to second processing unit 120, which is used as a main processing unit, via a connection 130, for example an interprocessor connection.

The first and the second processing unit include typical interfaces for communication, for example for a LIN bus (LIN), a CAN bus (CAN), Ethernet (ETH), and via further inputs and outputs. The inputs are used, for example, for reading in a sensor, such as switches (hazard warning light button, light switch, etc.), and the outputs are used, for example, for activating an actuator, such as for lights, horn, windshield wipers, etc.

Computing device 100 also includes a power supply unit 140 via which main processing unit 120 may be supplied with power or activated.

Activation unit 110 is advantageously designed in such a way that it may start up very quickly, and at the same time has a very low quiescent current requirement. Activation unit 110 may be an independent circuit (IC) or may be part of the main processing unit, for example in a system on a chip (SoC).

Figure 2:
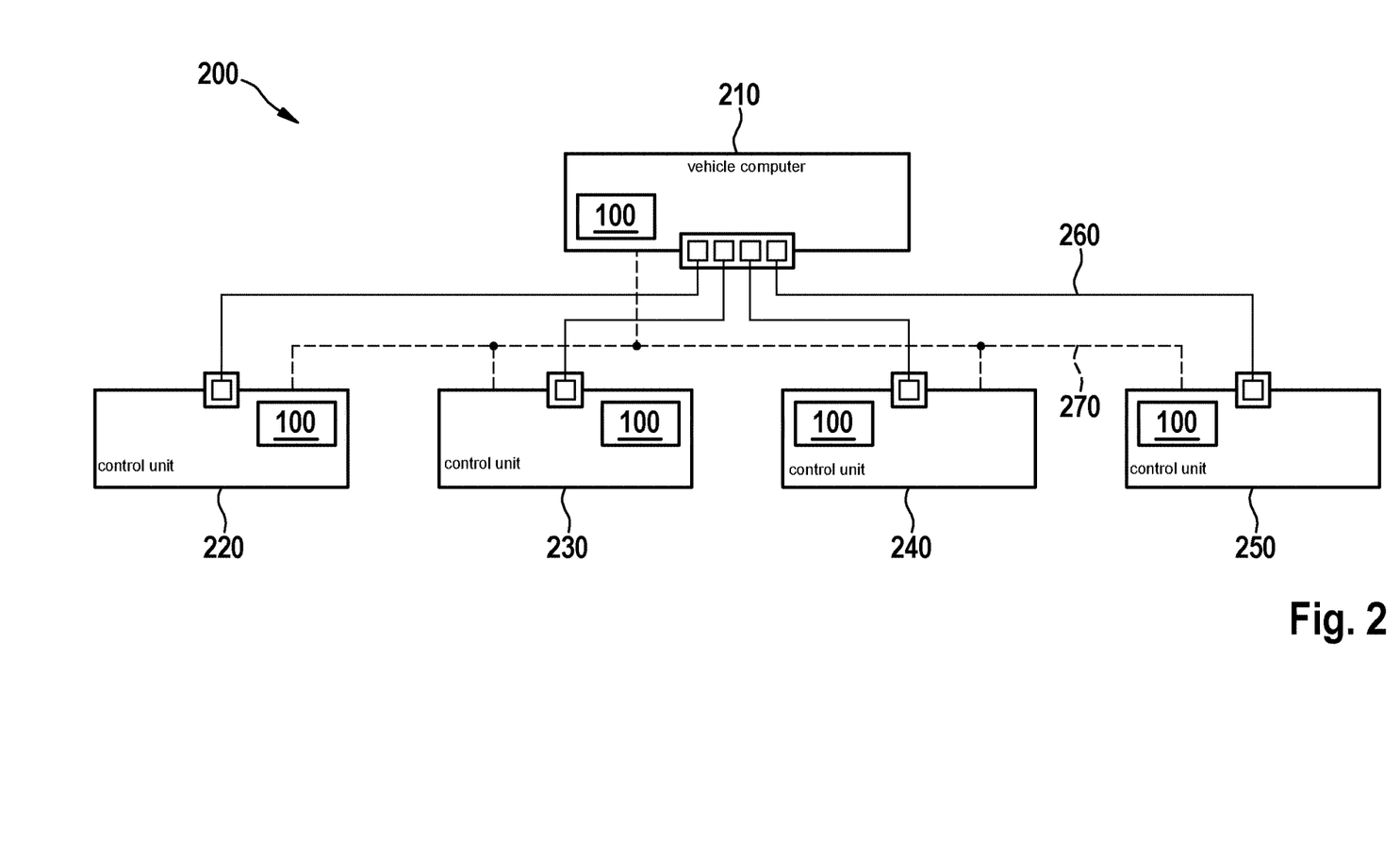
FIG. 2 shows one preferred specific embodiment of a network according to the present invention.

FIG. 2 schematically illustrates one preferred specific embodiment of a network 200 according to the present invention.

In the shown example, network 200 includes five devices 210 through 250, each of which is provided with a preferred specific embodiment of a computing device 100 according to the present invention. In a vehicle, these devices may be designed, for example, as a so-called vehicle computer 210 and control units or ECUs 220 through 250.

Vehicle computer 210 is connected to control units 220 through 250 via a first (in particular particularly high-performance) data link 260 such as Ethernet. In addition, a second data link 270 is provided via which activation signals are transferred according to preferred specific embodiments of the present invention. First data link 260 and/or second data link 270 may be designed as point-to-point links or as a bus system.

Second data link 270 may preferably also be used as a fallback solution, for example in the event of a failure of first data link 260. For this purpose, second data link 270 is advantageously also connected directly to main processing unit 120. Such a direct connection is likewise advantageous, for example to bridge the time gap until the first data link (an Ethernet network, for example) has started up. However, it must be ensured that an activation signal on second data link 270 does not start or activate the main processing unit.

Second data link 270 may be implemented with the aid of CAN or CAN FD, for example, since this bus system provides the necessary properties for the wakeup and communication lines: wakeable hardware is present, and the communication on CAN may take place directly without a handshake or establishment of a connection between the users initially having to take place. It is also advantageous that CAN is a so-called broadcast medium in which each message and in particular the activation signal may be received by each user.

One (or also multiple) such network(s) may be provided in a vehicle as zonal E/E architecture, for example.

In the zonal E/E architecture, sensors, actuators, mechatronic systems, and control units (smart ECUs, for example) are connected, corresponding to their geometric position in the vehicle, to one or multiple vehicle computers (210) via zone control units (220 through 250). The zone control units function as energy and data distributors, and the actual logic/function is computed on the vehicle computer if possible.

In such a network, on the one hand costs may be saved by simplifying the wire harness, and on the other hand the flexibility and scalability may be increased by the concentration/centralization of software on the vehicle computers. By use of the present invention, a very rapid, selective wakeup of the zone control units and vehicle computer(s) is possible, while at the same time taking into account a low quiescent current requirement of the components.

Figure 3:
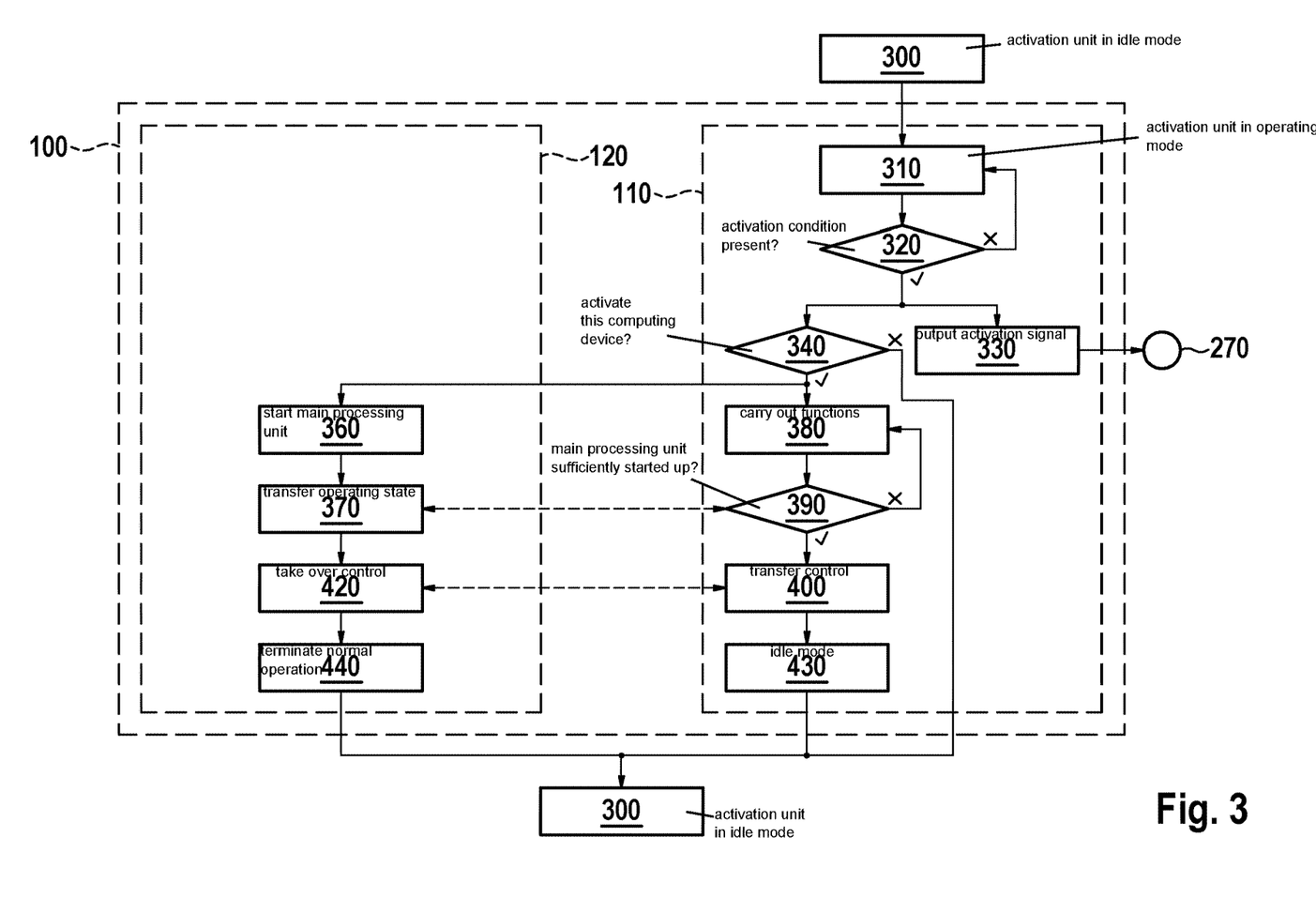
FIG. 3 shows one preferred specific embodiment of a method according to the present invention.

FIG. 3 illustrates a flowchart of a first preferred specific embodiment of a method according to the present invention. The method is carried out, for example, by activation unit or first processing unit 110 (right column) and by main processing unit or second processing unit 120 (left column) in one of illustrated computing devices 100. This method may in particular be carried out by any of computing devices 210 through 250 shown in FIG. 2.

The method begins in a step 300. In this step, activation unit 110 is in particular in an idle mode having very low energy consumption. Main processing unit 120 is completely switched off.

Activation unit 110 changes to an operating mode in a step 310 and checks or monitors whether an activation condition is present, in particular periodically, for example in a predefined time pattern, or via interrupt processing, for example. Such an activation condition may be present in particular in the form of a certain level at a digital input, or a signal at an analog input, or may include, for example, waking up a LIN network by a LIN user or the like, for example receiving a wakeup signal at a LIN or CAN input of activation unit 110.

If it is determined in a step 320 that no activation condition is present, the method returns to step 310. However, if it is determined that an activation condition is present, steps 330 and 340 are carried out. These steps may in particular be carried out in parallel or also in a time-offset manner. Steps 310 and 320 may take place in an idle mode of the activation unit or may represent such an idle mode, and the following steps then take place in an operating mode of the activation unit or represent such an operating mode.

Activation unit 110 outputs an activation signal, including the activation condition, on an activation line 270, in particular to the users of the same network, in step 330. The start-up time from recognizing the presence of an activation condition until an activation signal is output may preferably be less than 50 ms, more preferably less than 20 ms, even more preferably less than 10 ms. As is apparent in FIG. 2, this activation signal is thus output to all connected computing devices 100 of users 210 through 250. A corresponding possible response on the receiver side is explained later with reference to FIG. 4. It may be provided that this activation signal is transferred only to certain or selected other computing devices, in particular only to those that are affected by the activation condition. If second data link 270 is implemented with the aid of CAN or CAN FD, for example, by the use of so-called partial networking-capable transceivers, it is possible for the distribution of the activation signal to take place in a targeted manner, and not in the entire network.

It is checked or determined in step 340 whether the activation condition recognized in step 320 requires an activation of this affected computing device 100, and thus also of second processing unit 120, which is configured to provide the functionality of the computing device. If this is not the case, the method returns to the start 300 in order to once again monitor the presence of an activation condition.

However, if this is the case, main processing unit 120 is started up in step 360, for example by furnishing its power or voltage supply. For this purpose, activation unit 110 may be connected to a switch for switching on the power or voltage supply.

As soon as main processing unit 120 has sufficiently started up or initialized in order to execute program commands, it transfers its particular present operating state to activation unit 110 in a step 370. Similarly, activation unit 110 monitors whether main processing unit 120 has started up. Namely, activation unit 110 is preferably configured to itself carry out certain functions or function steps of the functionality provided by second processing unit 120 in a block 380 until main processing unit 120 is able to do so itself, i.e., the start-up operation has progressed sufficiently. These functionalities include, for example, vehicle access without unlocking with the aid of a physical key (so-called keyless entry), in which the identification of the correct key/ID transmitter and its position takes place via radio transmission or radio triangulation. The initialization and activation of the radio modules, as well as the central coordination when the radio modules are distributed over multiple zones, are such time-critical function steps. In other words, activation unit 110 is configured to carry out a first portion of function steps of a function step sequence, and main processing unit 120 is configured to carry out a second portion of function steps of the function step sequence. The first and second portions together form the entire function step sequence.

Activation unit 110 checks in a step 390 whether main processing unit 120 is already sufficiently started up so that it may take over these tasks or carry out function steps itself. If this is not the case, the method returns to step 380. However, if this is the case, in a step 400 activation unit 110 transfers the control over the functionality to main processing unit 120, which takes over this control in a step 420.

The activation unit subsequently goes back into an idle mode 430, and the main processing unit goes into normal operation 440. Idle mode 430 of activation unit 110 may in particular correspond to step 300. In contrast, normal operation 440 of second processing unit 120 represents the normal operation for providing the presently requested or needed functionality, based on the activation condition.

If the requested functionality has concluded, the main processing unit terminates normal operation 440 and preferably goes back into the switched-off state corresponding to step 300.

Figure 4:
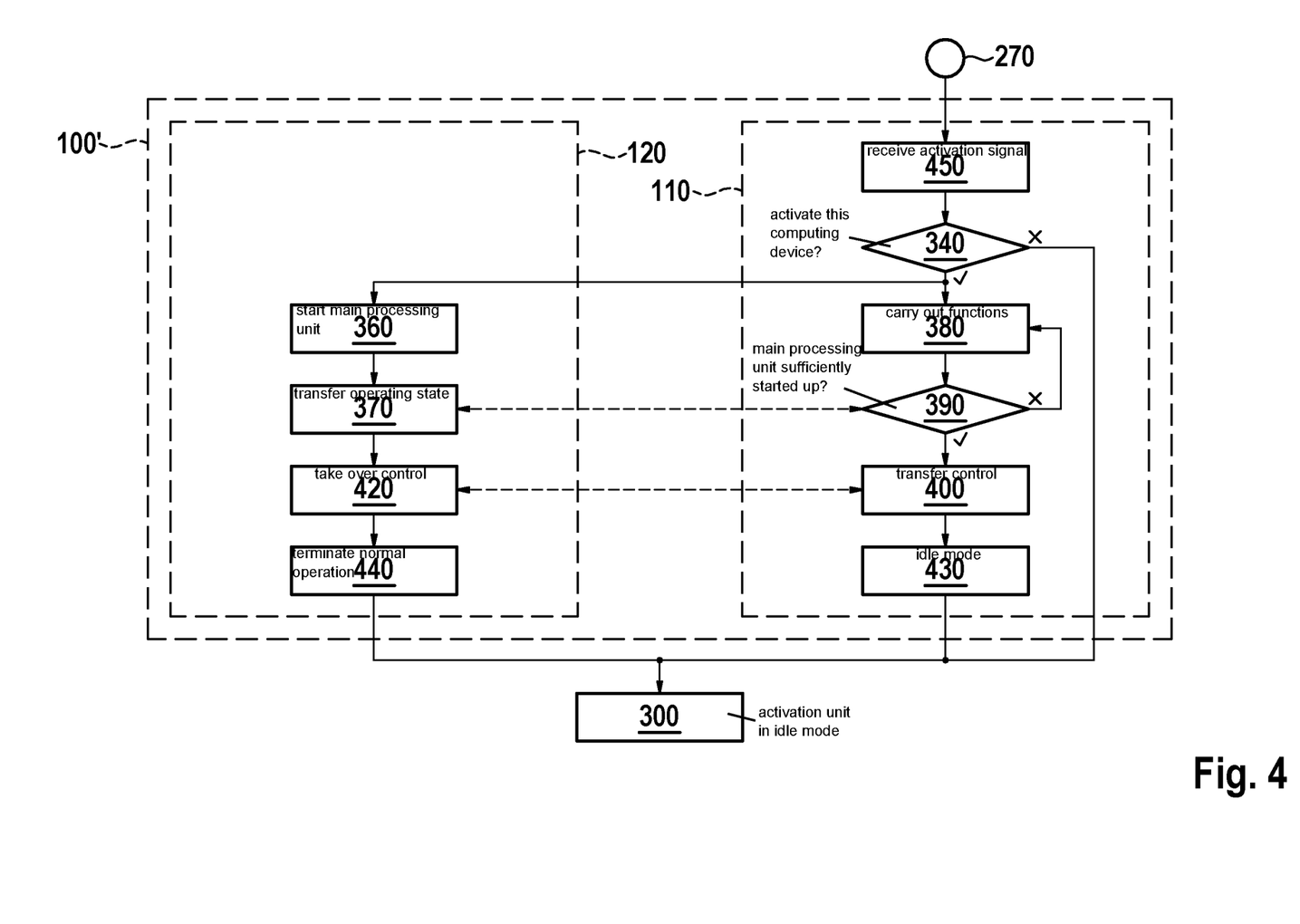
FIG. 4 shows a further preferred specific embodiment of a method according to the present invention.

FIG. 4 illustrates a corresponding sequence in a processing unit (computing device) 100' that receives an activation signal via second data link 270. Method steps that are identical to those in FIG. 3 are provided with the same reference numerals.

The activation signal is received in a step 450. If activation unit 110 of other computing device 100' (each of users 210 through 250) is not yet activated at this point in time, it is now activated. Namely, in the course of a wakeup request, processing units that are in an idle mode or in a deactivated state with a deactivated or minimized current or voltage supply are reactivated, i.e., woken up.

It is then checked in a step 340, as in FIG. 3, whether affected computing device 100' must be activated. The remaining method steps correspond to those from FIG. 3.

According to a further preferred specific embodiment, the communication in steps 370 and 390 takes place not only between the affected processing units, but also between multiple or all processing units of the network. This also allows functions in a distributed system to be carried out. To coordinate the system start-up, each computing device 100 or each processing unit 110, 120 transmits its present status to the other users via second data link 270. The status may, for example, encompass starting the activation unit or the main processing unit or switching it on/off.

The exchange of the information, its importance, and time requirements are suitably defined, for example, in a so-called network management protocol. The user that is essential for carrying out the function, generally the vehicle computer, may coordinate carrying out the function over the various users, based on the status of the individual users. The use of a network management protocol also provides the option for detecting errors, for example the failure of a user, with the aid of a timeout monitor, to abort a start-up operation, for example due to incorrect surroundings conditions, or also to coordinate further system transitions, for example the behavior during a reset or shutting down the users of network 200. The network management protocol, depending on availability, may be transferred via the second data link and/or via the first data link of network 200.

It is understood that the present invention may also be used in other E/E architectures having similar properties, for example for the system start-up of so-called domain masters in a domain-oriented E/E architecture. In general, the present invention may always be used when a computing device carries out its start-up operation in the described manner.

What is claimed is:

1. A computing device, comprising:
   a first processing unit and a second processing unit that are connected to one another in a data-transmitting manner;
   wherein:
   the second processing unit is configured to perform a function by executing an entire sequence of steps;
   the first processing unit is configured, upon recognition that an activation condition is present, to:
   determine whether the activation condition requires an activation of the second processing unit;
   when a result of the determination is that the activation condition requires the activation of the second processing unit, activate the second processing unit by outputting an activation signal, including the activation condition, on an activation line;
   determine that the function is required to be performed;
   after the outputting of the activation signal and based on the determination that the function is required to be performed, iteratively perform the following until an end condition:
   determine whether the second processing unit is in an awake state by which the second processing unit is able to proceed with the performance of the steps of the function; and
   in response to a negative result of the determination of whether the second processing unit is in the awake state, proceed with performance of a part of the sequence of steps; and in response to the end condition, transfer to the second processing unit continued performance of the function so that a remainder of the sequence of steps not yet performed by the first processing unit is performed by the second processing unit; and the end condition is a positive result of the determination of whether the second processing unit is in the awake state.

2. The computing device as recited in claim 1, wherein the first processing unit is configured to activate the second processing unit by activating a power supply of the second processing unit.

3. The computing device as recited in claim 1, wherein the first processing unit is configured to check whether the second processing unit is activated.

4. The computing device as recited in claim 1, wherein the second processing unit is configured to communicate its operating state to the first processing unit.

5. The computing device as recited in claim 1, wherein the first processing unit is configured to recognize the presence of an activation condition when: (i) it receives an activation signal, including the activation condition, on the activation line, or (ii) a digital or analog signal is present at an input.

6. The computing device as recited in claim 1, wherein, whenever the second processing unit is in the awake state and is ready for performance of the function, the first processing unit does not perform any of the steps of the sequence.

7. A network comprising at least two computing devices, each of the two computing devices including:
a first processing unit and a second processing unit that are connected to one another in a data-transmitting manner;
wherein:
the second processing unit is configured to perform a function by executing an entire sequence of steps;
the first processing unit is configured, upon recognition that an activation condition is present, to:
determine whether the activation condition requires an activation of the second processing unit;
when a result of the determination is that the activation condition requires the activation of the second processing unit, to activate the second processing unit by outputting an activation signal, including the activation condition, on an activation line;
determine that the function is required to be performed;
after the outputting of the activation signal and based on the determination that the function is required to be performed, iteratively perform the following until an end condition:
determine whether the second processing unit is in an awake state by which the second processing unit is able to proceed with the performance of the steps of the function; and
in response to a negative result of the determination of whether the second processing unit is in the awake state, proceed with performance of a part of the sequence of steps; and
in response to the end condition, transfer to the second processing unit continued performance of the function so that a remainder of the sequence of steps not yet performed by the first processing unit is performed by the second processing unit; and
the end condition is a positive result of the determination of whether the second processing unit is in the awake state.

8. The network as recited in claim 7, wherein:
the at least two computing devices are connected in a data-transmitting manner via a first data link and a second data link; and
the first processing unit is configured to perform the activation of the second processing unit using the first data link, the activation transferring the second processing unit into a state by which the second data processing unit performs data transmissions on the second data link.

9. The network as recited in claim 7, wherein the first and/or second processing unit of a first of the at least two computing devices is configured to communicate its operating state to the first and/or second processing unit of a second of the at least two computing devices.

10. A method of a system that includes a first processing unit and a second processing unit, which are connected to one another in a data-transmitting manner, wherein the second processing unit is configured to perform a function by executing an entire sequence of steps, the method comprising the following steps:
recognizing, by the first processing unit, that an activation condition is present; determining, by the first processing unit, whether the activation condition requires an activation of the second processing unit;
when a result of the determination is that the activation condition requires the activation of the second processing unit, activating the second processing unit by outputting an activation signal, including the activation condition, on an activation line;
determining, by the first processing unit that the function is required to be performed;
after the outputting of the activation signal and based on the determination that the function is required to be performed, the first processing unit iteratively performing the following until an end condition:
determining whether the second processing unit is in an awake state by which the second processing unit is able to proceed with the performance of the steps of the function; and
in response to a negative result of the determination of whether the second processing unit is in the awake state, proceeding with performance of a part of the sequence of steps; and
in response to the end condition, transferring to the second processing unit continued performance of the function so that a remainder of the sequence of steps not yet performed by the first processing unit is performed by the second processing unit, wherein the end condition is a positive result of the determination of whether the second processing unit is in the awake state.

11. The method as recited in claim 10, wherein the recognition by the first processing unit that an activation condition is present includes receiving an activation signal, including the activation condition, on an activation line.

12. The method as recited in claim 10, wherein the method is carried out in a computing device.

13. A non-transitory machine-readable memory medium on which is stored a computer program for activating a second processing unit of a computing device that includes a first processing unit and the second processing unit, which are connected to one another in a data-transmitting manner, the second processing unit being configured to perform a function by executing an entire sequence of steps, the computer program, when executed by a processor of the first processing unit, causing the processor to perform the following steps:

recognizing, by the first processing unit, that an activation condition is present; determining, by the first processing unit, whether the activation condition requires an activation of the second processing unit;
when a result of the determination is that the activation condition requires the activation of the second processing unit, activating the second processing unit by outputting an activation signal, including the activation condition, on an activation line;
determining, by the first processing unit that the function is required to be performed;
after the outputting of the activation signal and based on the determination that the function is required to be performed, the first processing unit iteratively performing the following until an end condition:
   determining whether the second processing unit is in an awake state by which the second processing unit is able to proceed with the performance of the steps of the function; and
   in response to a negative result of the determination of whether the second processing unit is in the awake state, proceeding with performance of a part of the sequence of steps; and
in response to the end condition, transferring to the second processing unit continued performance of the function so that a remainder of the sequence of steps not yet performed by the first processing unit is performed by the second processing unit, wherein the end condition is a positive result of the determination of whether the second processing unit is in the awake state.

* * * * *